US012722706B2

(12) United States Patent
Jeong et al.

(10) Patent No.: US 12,722,706 B2
(45) Date of Patent: Sep. 1, 2026

(54) VEHICLE FRAME ASSEMBLY

(71) Applicants: Hyundai Motor Company, Seoul (KR); Kia Corporation, Seoul (KR)

(72) Inventors: Seung Min Jeong, Hwaseong-si (KR); Won Hae Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 398 days.

(21) Appl. No.: 18/494,273

(22) Filed: Oct. 25, 2023

(65) Prior Publication Data

US 2024/0425117 A1 Dec. 26, 2024

(30) Foreign Application Priority Data

Jun. 22, 2023 (KR) ........................ 10-2023-0080600

(51) Int. Cl.
*B62D 21/15* (2006.01)
*B62D 24/00* (2006.01)
(Continued)

(52) U.S. Cl.
CPC ........... *B62D 21/157* (2013.01); *B62D 24/00* (2013.01); *B62D 25/025* (2013.01); *B62D 25/2036* (2013.01); *B60J 5/06* (2013.01)

(58) Field of Classification Search
CPC .... B62D 21/157; B62D 24/00; B62D 25/025; B62D 25/2036; B62D 21/02; B62D 21/15;
(Continued)

(56) References Cited

U.S. PATENT DOCUMENTS 8,567,857 B2 * 10/2013 Fujii ..................... B60R 22/023 296/193.07
10,513,295 B2 * 12/2019 Takahashi ............ B62D 27/023
(Continued)

FOREIGN PATENT DOCUMENTS

CN 113165700 A 7/2021
JP 3804141 B2 * 8/2006
(Continued)

OTHER PUBLICATIONS

JP-2008189137-A English Translation (Year: 2008).*
(Continued)

*Primary Examiner* — Michael T. Walsh
(74) *Attorney, Agent, or Firm* — Slater Matsil, LLP

(57) ABSTRACT

An embodiment vehicle frame assembly includes a plurality of vehicle body cross members disposed at a vehicle body floor of a vehicle and extending in a width direction of the vehicle, a vehicle body side sill disposed outside the vehicle in an outward direction of the vehicle body cross members, connected to the vehicle body cross members, and extending in a longitudinal direction of the vehicle, and a support member including extension ends extending in multiple directions from a center of the support member, each of the extension ends connecting at least one of the plurality of vehicle body cross members to the vehicle body side sill, wherein the plurality of vehicle body cross members, the vehicle body side sill, and the support member are connected to one another so as to define a load path for a lateral collision of the vehicle.

20 Claims, 9 Drawing Sheets

(51) Int. Cl.

| | |
|---|---|
| ***B62D 25/02*** | (2006.01) |
| ***B62D 25/20*** | (2006.01) |
| *B60J 5/06* | (2006.01) |

(58) Field of Classification Search
CPC .. B62D 25/2009; B62D 27/065; B62D 21/08; B62D 21/03; B60J 5/06; B60Y 2306/01
See application file for complete search history.

(56) References Cited

U.S. PATENT DOCUMENTS

| | | | | |
|---|---|---|---|---|
| 10,793,195 | B2 * | 10/2020 | Kato .................... | B62D 21/157 |
| 2018/0334022 | A1 | 11/2018 | Rawlinson et al. | |
| 2021/0197898 | A1 | 7/2021 | Toyota | |
| 2022/0048574 | A1 | 2/2022 | Grosse et al. | |

FOREIGN PATENT DOCUMENTS

| | | | | | |
|---|---|---|---|---|---|
| JP | 2007190992 | A | * | 8/2007 | |
| JP | 2008189137 | A | * | 8/2008 | |
| JP | 2013256290 | A | | 12/2013 | |
| JP | 2019018822 | A | | 2/2019 | |
| JP | 2019018823 | A | | 2/2019 | |
| JP | 2020131845 | A | * | 8/2020 | ............. B62D 21/00 |
| JP | 2020189567 | A | | 11/2020 | |
| KR | 101947480 | B1 | | 2/2019 | |

OTHER PUBLICATIONS

JP-2007190992-A English Translation (Year: 2007).*
JP-3804141-B2 English Translation (Year: 2006).*
JP-2020131845-A English Translation (Year: 2020).*

* cited by examiner

VEHICLE FRAME ASSEMBLY

CROSS-REFERENCE TO RELATED APPLICATIONS

This application claims the benefit of Korean Patent Application No. 10-2023-0080600, filed on Jun. 22, 2023, which application is hereby incorporated herein by reference.

TECHNICAL FIELD

The present invention relates to a vehicle frame assembly.

BACKGROUND

Recently, as a modularized device having a simple structure which is capable of being designed according to various requirements of customers at required times of the customers, a purpose built vehicle (PBV) has been introduced. The PBV is an eco-friendly versatile mobility vehicle which can be provided at a low cost depending on objects and requirements of a business of a customer. With the increase in the requirements of the marketplace, the necessity of small production of various kinds of vehicles is increasing.

Accordingly, the PBV has adopted a structure in which a versatile vehicle body designed in consideration of hailing and/or delivery characteristics is coupled to an upper portion of a chassis frame in order to ensure convenience of boarding of passengers and loading of baggage. With the adoption of the above-mentioned structure, a sliding door is applied to the PBV in order to further improve the convenience of boarding of passengers and loading of baggage. For this reason, vehicle body side sills are disposed lower than a floor cross member.

At this point, because the vehicle body side sills are disposed lower than the floor cross member, the height difference between the floor cross member and the vehicle body side sill reinforcement structure may increase, thereby causing a problem whereby a structure for preparing for a lateral collision of the vehicle becomes weak.

Accordingly, there is a need to provide a solution for realizing a load path for a lateral collision of a vehicle by reducing the height difference between the floor cross member and the vehicle side sill reinforcement structure.

Details described in this background section are intended merely for the purpose of promoting an understanding of the background of embodiments of the present invention and should not be construed as an acknowledgment of the prior art that is already known to those of ordinary skill in the art.

SUMMARY

The present invention relates to a vehicle frame assembly. Particular embodiments relate to a vehicle frame assembly to which a sliding door is applied, in which a load path for a lateral collision of a vehicle is formed by an effective connecting structure between vehicle body cross members, vehicle body side sills, and support members in order to maximize torsional rigidity and connecting ability of the vehicle.

Therefore, embodiments of the present invention have been made in view of problems in the art, and an embodiment of the present invention provides a vehicle frame assembly to which a sliding door is applied, in which a load path for a lateral collision of the vehicle is formed by an effective connecting structure between vehicle body cross members, vehicle side sills, and support members, with the result that torsional rigidity and connecting ability of the vehicle is maximized, and an excessive load applied to the lower frame of the vehicle is distributed to the various members, thereby improving stability of a battery upon the lateral collision of the vehicle.

Embodiments of the present invention are not limited to the above-mentioned embodiments, and other embodiments of the present invention, which are not mentioned above, will be clearly understood by those skilled in the art to which the present invention belongs, from the following descriptions.

In accordance with an embodiment of the present invention, a vehicle frame assembly is provided including a plurality of vehicle body cross members, which are provided at a vehicle body floor of a vehicle and extend in a width direction of the vehicle, a vehicle body side sill, which is provided outside the vehicle in an outward direction of the vehicle body cross members and which is connected to the vehicle body cross members and extends in a longitudinal direction of the vehicle, and a support member including extension ends which extend in multiple directions from a center thereof, each of the extension ends connecting at least one of the plurality of vehicle body cross members to the vehicle body side sill, wherein the plurality of vehicle body cross members, the vehicle body side sill, and the support member are connected to one another so as to form a load path for a lateral collision of the vehicle.

Each of the plurality of vehicle body cross members may be connected to an inner surface of the vehicle body side sill in a state of being in surface contact therewith.

The vehicle frame assembly may further include a chassis frame provided at a lower portion of a vehicle body, the chassis frame being disposed in an inward direction of the vehicle, and a battery pack being mounted on the chassis frame.

The chassis frame may include a plurality of mounting portions which extend outwards, and each of the vehicle body floor and the plurality of vehicle body cross members are fastened to a corresponding one of the plurality of mounting portions using a bolt and are thus connected to the chassis frame.

The chassis frame may be detachably coupled to the plurality of vehicle body cross members and the vehicle body side sill.

All of the plurality of vehicle body cross members, the vehicle body side sill, and the support member may be connected to the vehicle body floor of the vehicle.

Among the extension ends of the support member, two of the extension ends may obliquely extend from the center thereof and may be connected to two adjacent vehicle body cross members, and another of the extension ends may extend outwards and may be connected to the vehicle body side sill.

The vehicle frame assembly may further include a center side member which is disposed at the center of the support member and connects at least two of the plurality of vehicle body cross members to each other in the longitudinal direction of the vehicle, an the center side member may be parallel to the vehicle body side sill.

The vehicle frame assembly may further include an extension member, which extends in the direction of width of the vehicle and connects the center side member to the vehicle body side sill, and the plurality of vehicle body cross members, the vehicle body side sill, the extension member, and the center side member may be connected to one another to form a load path for a lateral collision of the vehicle.

The support member may include a plurality of support members which are spaced apart from each other in the longitudinal direction of the vehicle and are positioned in a direction identical to a direction in which the center side member is positioned.

The vehicle frame assembly may further include a door upper panel, which is provided above the vehicle body side sill and is connected to the vehicle body floor, and a door lower panel, which is provided below the door upper panel and is coupled to the door upper panel at a portion thereof abutting the door upper panel, wherein the door upper panel and the door lower panel define therebetween an internal space which receives therein a door arm configured to allow a sliding door of the vehicle to be opened and closed.

Each of the door upper panel and the door lower panel may be connected to the vehicle body side sill at a first side thereof and may have a shape which increases in width moving toward a center thereof from a rear portion thereof.

The center side member may be coupled to the door lower panel so as to allow a load caused by a lateral collision of the vehicle to be transmitted to the door lower panel.

BRIEF DESCRIPTION OF THE DRAWINGS

The above and other objects, features, and other advantages of embodiments of the present invention will be more clearly understood from the following detailed description taken in conjunction with the accompanying drawings, in which.

DETAILED DESCRIPTION OF ILLUSTRATIVE EMBODIMENTS

Figure 1:
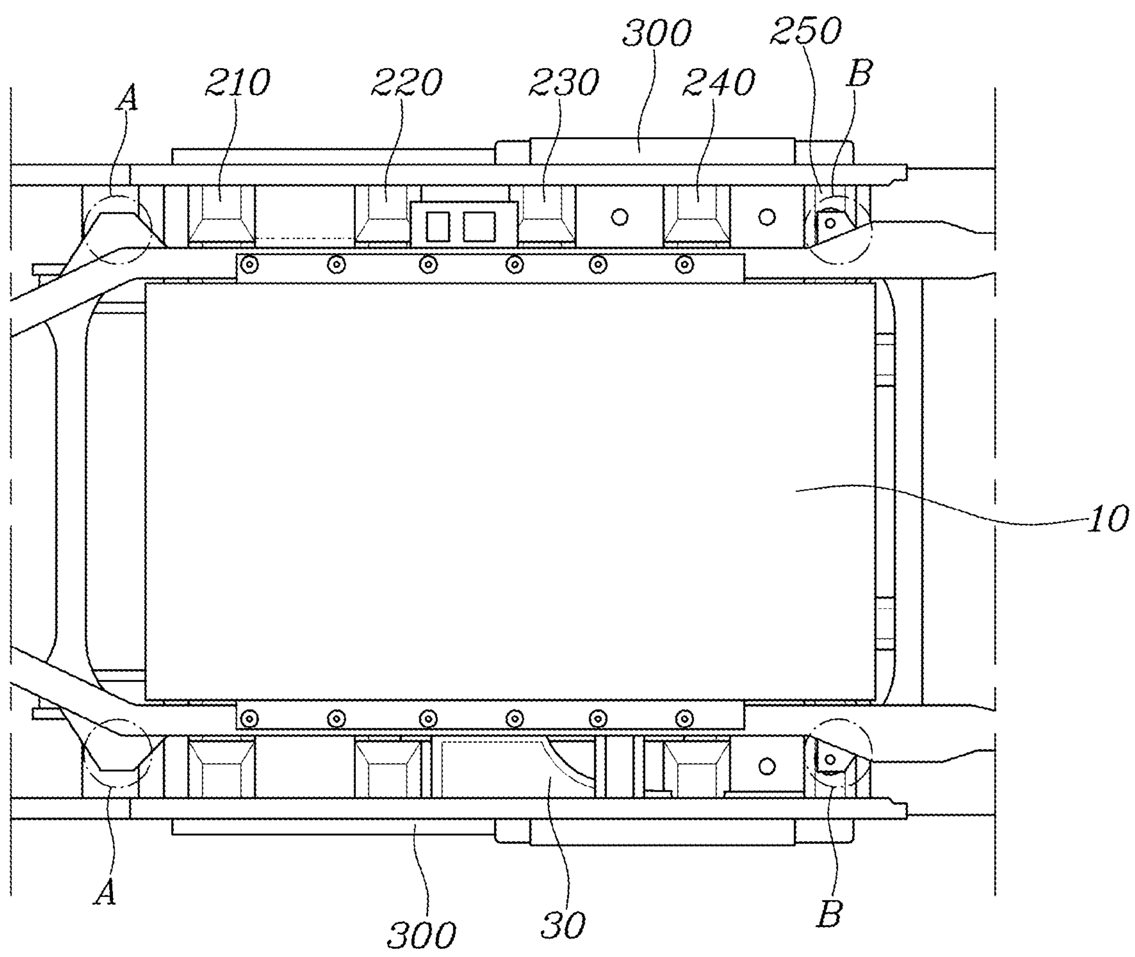
FIG. 1 is a view illustrating a vehicle frame assembly according to an embodiment of the present invention.

Reference will now be made in detail to the preferred embodiments of the present invention, examples of which are illustrated in the accompanying drawings. Wherever possible, the same reference numbers will be used throughout the drawings to refer to the same or like parts.

A description will now be given in detail according to exemplary embodiments disclosed herein, with reference to the accompanying drawings. For the sake of brevity of description with reference to the drawings, the same or equivalent components may be denoted by the same reference numbers, and a description thereof will not be repeated.

In general, suffixes such as "module" and "unit", when used in the following description, may be used to refer to elements or components for easy preparation of the specification. The use of such suffixes herein is merely intended to facilitate the description of the specification, and the suffixes do not imply any special meaning or function.

Furthermore, in the following description of embodiments disclosed herein, if it is decided that a detailed description of known functions or configurations related to the embodiments of the invention would make the subject matter of the embodiments unclear, such detailed description is omitted. The accompanying drawings are used to assist in easy understanding of various technical features, and it should be understood that the embodiments presented herein are not limited by the accompanying drawings. As such, the embodiments of the present disclosure should be construed to extend to any alterations, equivalents, and substitutes, in addition to those which are particularly set out in the accompanying drawings. It will be understood that although the terms "first", "second", etc. may be used herein to describe various elements, these elements should not be construed as being limited by these terms. These terms are only used to distinguish one element from another.

It should be understood that, when an element is referred to as being "connected to" another element, there may be intervening elements present, or the element may be directly connected with the another element. In contrast, it should be understood that, when an element is referred to as being "directly connected to" another element, there are no intervening elements present.

A singular representation may include a plural representation unless the context clearly indicates otherwise.

Terms such as "includes" or "has" used herein should be considered as indicating the presence of various features, numbers, steps, operations, elements, components, or combinations thereof disclosed in the specification, but it should be understood that the presence or addition of one or more other features, numbers, steps, operations, elements, components, or combinations thereof is not excluded.

Hereinafter, embodiments of the present invention will be described in detail by explaining preferred embodiments of the present invention with reference to the accompanying drawings.

An embodiment of the present invention proposes a construction in which vehicle body side sills, a battery cross member, a chassis frame, and a floor cross member constitute a load path upon a lateral collision of a vehicle.

FIG. 1 is a view illustrating a vehicle frame assembly according to an embodiment of the present invention. Although FIG. 1 mainly illustrates components associated with the embodiment, it goes without saying that more or fewer components may be included in realization of an actual vehicle frame assembly.

Referring to FIG. 1, the vehicle frame assembly according to an embodiment of the present invention may include a vehicle body cross member, vehicle body side sills 300, and a support member 400.

First, the vehicle body cross member may include a plurality of vehicle body cross members, which are provided at a vehicle body floor 20 and which are arranged from the front side to the rear side of the vehicle body floor 20 and extend laterally. The vehicle cross member may be divided into a first vehicle body cross member 210, a second vehicle body cross member 220, a third vehicle body cross member 230, a fourth vehicle body cross member 240, and a fifth vehicle body cross member 250, starting from the front side of the vehicle. Since the plurality of vehicle body cross members are arranged so as to be spaced apart from one another at regular intervals, impact force caused by lateral collision of the vehicle can be distributed in multiple directions, thereby distributing the load applied to the lower frame of the vehicle to various members.

A chassis frame 100 may be provided at the lower portion of the vehicle body and may be disposed in an inner side of the vehicle than the vehicle body side sills 300, and a battery pack 10 may be mounted on the chassis frame 100. The battery pack 10 of the vehicle may be positioned at the lowermost portion of the vehicle in order to position the center of mass of the vehicle at the lowest level and may be supported at a lateral side thereof by the chassis frame 100. Consequently, it is possible to reduce the load applied to the battery pack 10 upon a lateral collision of the vehicle.

The vehicle is provided with a plurality of mounting portions, which extend in an outward direction of the chassis frame 100 and are respectively fastened to the vehicle body floor 20 and the vehicle body cross member by means of bolts. More specifically, a first mounting portion A, which is provided at the front side of the chassis frame 100, may be coupled to the lower end of the vehicle body floor 20, and a second mounting portion B, which is provided at the rear side of the chassis frame 100, may be coupled to the fifth vehicle body cross member 250, thereby maximizing the torsional rigidity and connecting ability of the vehicle. The chassis frame 100 may be configured so as to be separated from the vehicle body cross member and the vehicle body side sills 300.

The vehicle body side sills 300 may be provided outside the vehicle so as to correspond to the vehicle body cross member and may be connected to the vehicle body cross member and extend in a longitudinal direction of the vehicle. The vehicle body side sills 300 may be connected at the inner surfaces thereof to the two ends of the vehicle body cross member, thereby maximizing the rigidity of the lower end of the vehicle body floor 20. As a result, since a load applied to the vehicle body side sills 300 is directly transmitted to the respective vehicle body cross members upon a lateral collision of the vehicle, the load is not excessively applied and is distributed, thereby increasing the overall frame rigidity.

Hereinafter, the support member 400 will be described with reference to FIG. 2.

Figure 2:
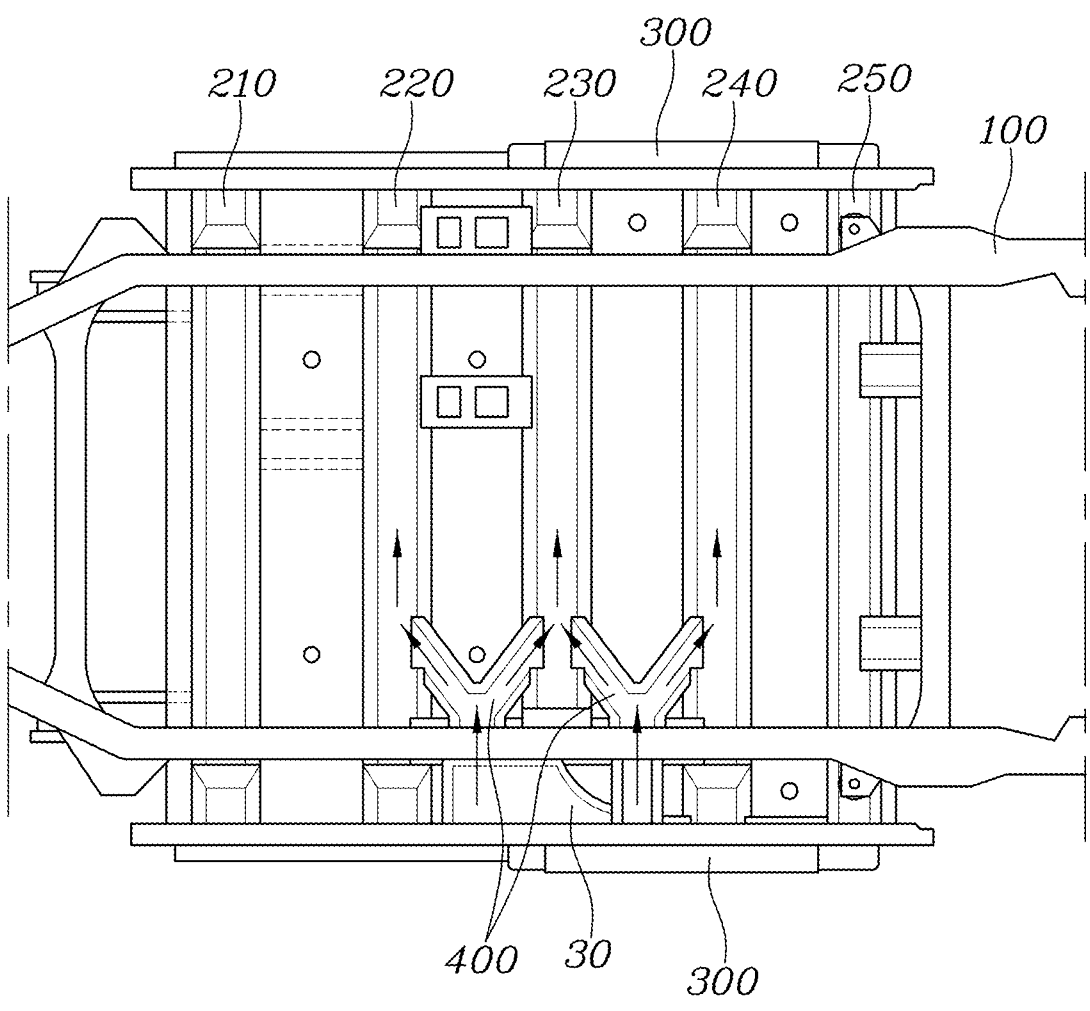
FIG. 2 is a view illustrating a load path of the vehicle frame assembly according to an embodiment of the present invention upon a lateral collision of a vehicle.

FIG. 2 is a view illustrating the load path of the vehicle frame assembly according to an embodiment of the present invention upon a lateral collision of the vehicle.

Referring to FIG. 2, the support member 400 is provided with extension ends, which extend in multiple directions from the center thereof to define a "Y" shape. The extension ends of the support member 400 may connect at least one vehicle body cross member to the vehicle body side sill 300. As illustrated in FIG. 2, among the extension ends, inner extension ends may obliquely extend from the center of the support member 400 and may be connected to two vehicle body cross members while an outer extension end may extend outwards and may be connected to the vehicle body side sill 300.

In an embodiment, the support member 400 may connect two adjacent vehicle body cross members, among the five vehicle body cross members, that is, the first vehicle body cross member 210 to the fifth vehicle body cross member 250, to the vehicle body side sill 300. Furthermore, since the support member 400 includes a plurality of support members 400, it is possible to more efficiently distribute the load caused by the lateral collision of the vehicle. By virtue of the connecting structure of the support members 400, the vehicle body cross members, the vehicle body side sill 300, and the support members 400 are connected to one another so as to form a load path for a lateral collision of the vehicle.

Figure 3:
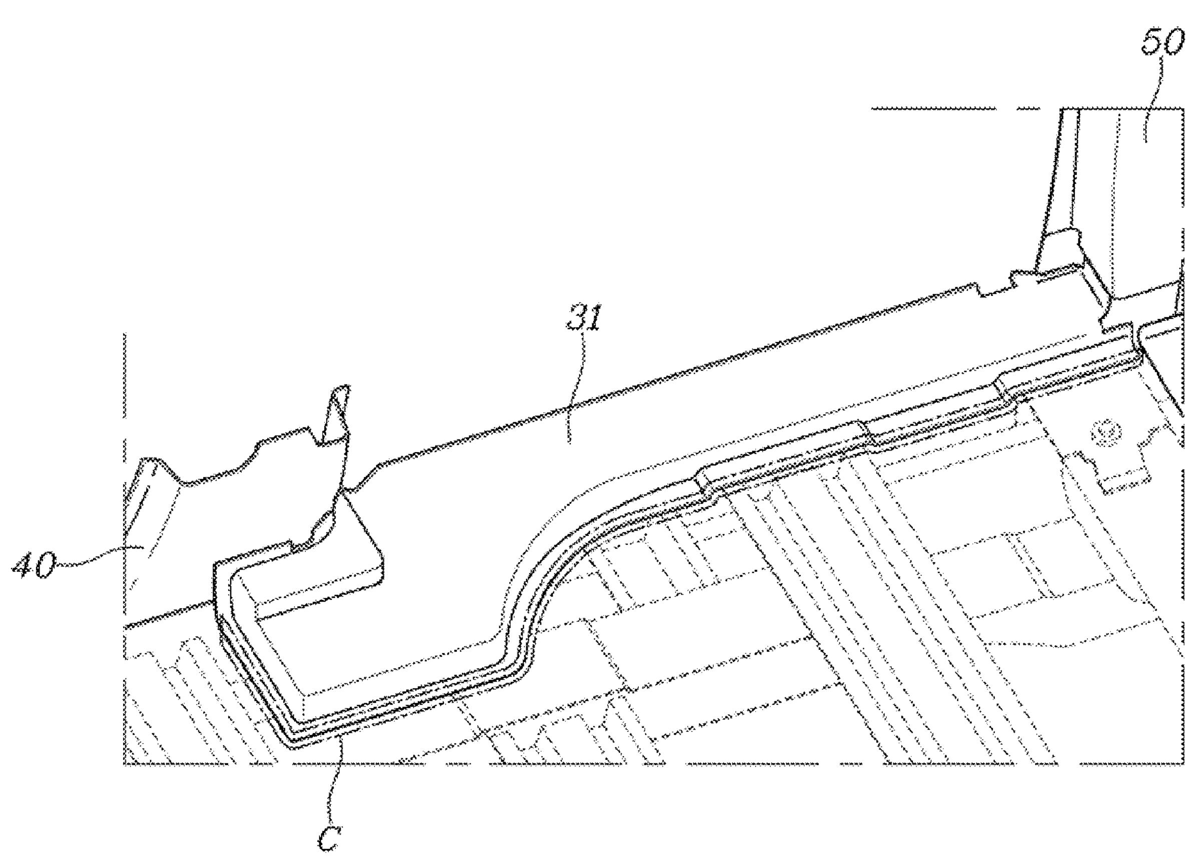
FIG. 3 is a view illustrating a center side member and a door upper panel, according to an embodiment of the present invention.
Figure 4:
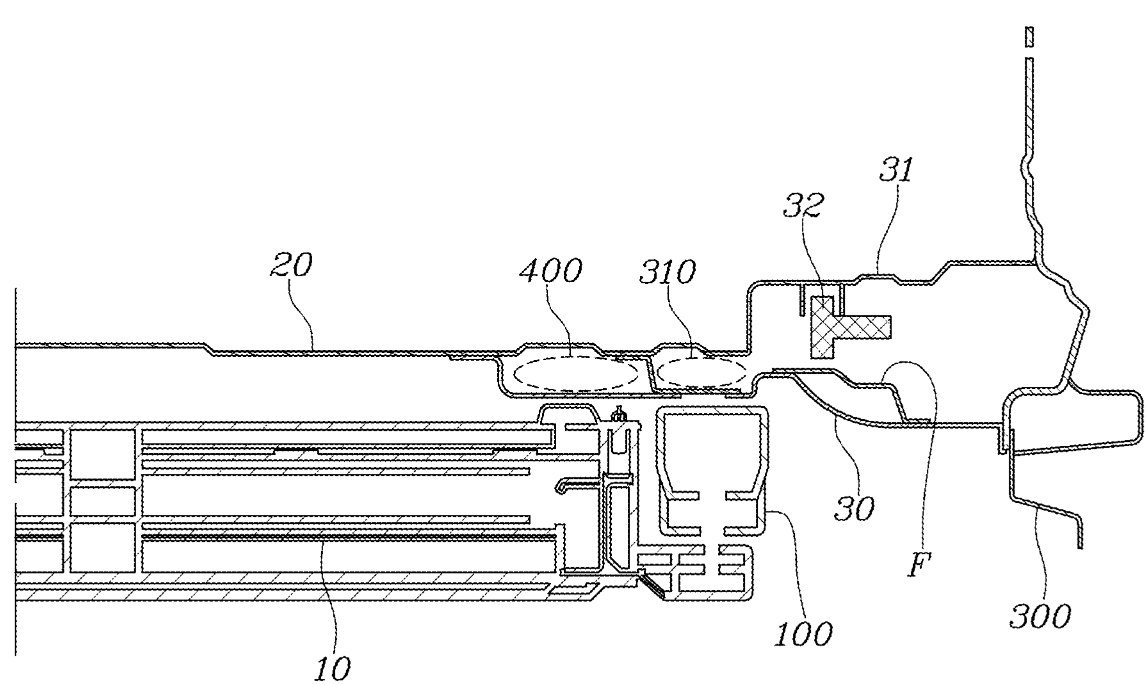
FIG. 4 is a view illustrating the longitudinal cross-section of a region of the vehicle in which the door upper panel and a door lower panel according to an embodiment of the present invention are provided.

FIG. 3 is a view illustrating a center side member 310 and a door upper panel 31, according to an embodiment of the present invention. FIG. 4 is a view illustrating the longitudinal cross-section of a region of the vehicle in which the door upper panel 31 and a door lower panel 30 according to an embodiment of the present invention are provided.

Referring to FIGS. 3 and 4, the door upper panel 31 may be provided above the vehicle body side sill 300 and may be connected to the vehicle body floor 20. The door upper panel 31 may connect a B pillar 40 at the front side thereof to a C pillar 50 at the rear side thereof in order to form an efficient connecting structure to the vehicle frame and to maximize the torsional rigidity and connecting ability of the vehicle. The door lower panel 30 may be provided below the door upper panel 31. The door lower panel 30 may be coupled to the center side member 310, which will be described later, so as to allow a load caused by a lateral collision of the vehicle to be transmitted to the door lower panel 30.

Particularly, the center side member 310 and the support member 400 may be disposed in that order inside the vehicle in an inward direction of the door lower panel 30. Here, because the lower surface of the center side member 310 is in contact with the lower ends of the support member 400 and the door lower panel 30, a load path structure in which a load caused by a lateral collision of the vehicle is transmitted to the center side member 310 from the door lower panel 30 and then to the support member 400 from the center side member 310 is formed.

Furthermore, since the door lower panel 30 is provided thereon with a roller guide structure F of a door arm 32, the sliding door of the vehicle can be stably opened and closed.

Furthermore, the door lower panel 30 and the door upper panel 31 may abut each other at the peripheries thereof in a vertical direction and may be coupled to each other at the peripheries in a surface-to-surface manner so as to define an internal space. The internal space defined between the door upper panel 31 and the door lower panel 30 may be provided therein with the door arm 32, which enables the sliding door of the vehicle to be opened and closed in a downward direction of the door upper panel 31. By virtue of the mounting structure of the door arm 32, it is possible to sufficiently compensate for a problem in connecting ability whereby the vehicle body side sill 300 is positioned at a lower level and a sliding door is applied.

Each of the door upper panel 31 and the door lower panel 30 may be connected at one side thereof to the vehicle body side sill 300 and may be configured to have a shape which increases in width moving toward the central portion from the rear portion thereof. The reason for this is to connect the central portions of the door upper panel 31 and the door lower panel 30 to the center side member 310. By virtue of this connecting structure, it is possible to uniformly distribute a load caused by a lateral collision of the vehicle in an inward direction of the vehicle.

Figure 5:
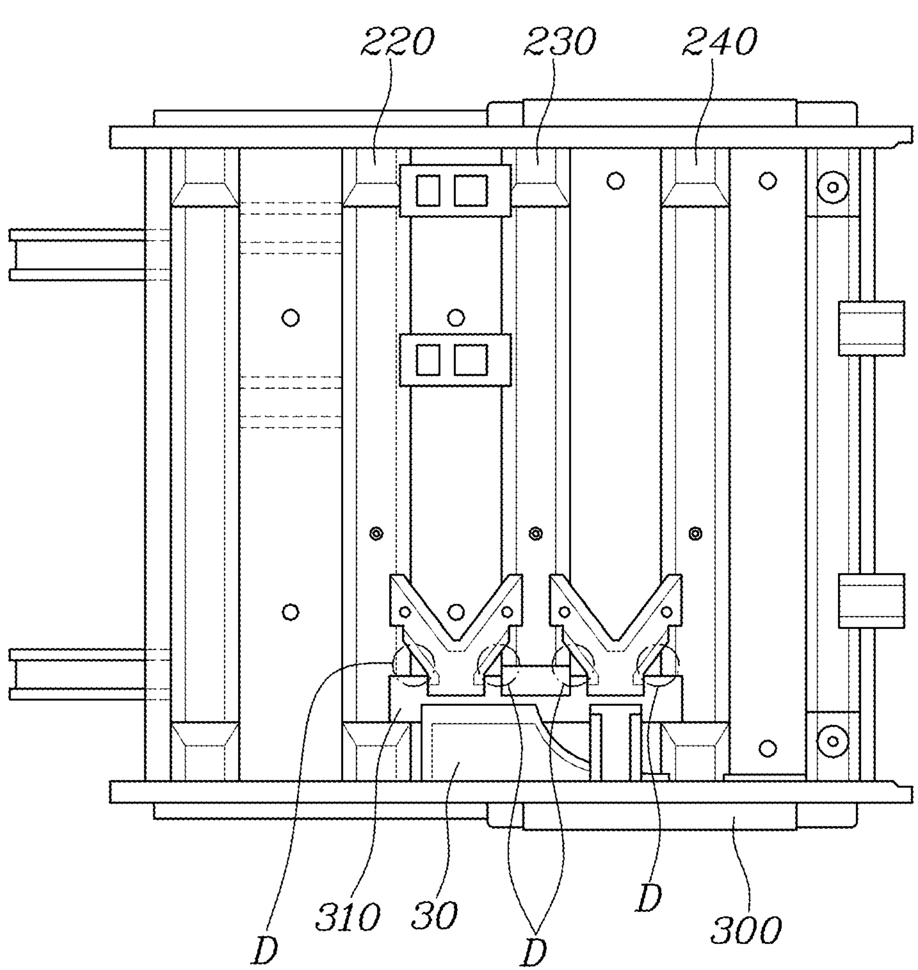
FIG. 5 is a view illustrating a triangular cross-sectional structure which is defined by vehicle body cross members, support members, and a center side member, according to an embodiment of the present invention.

FIG. 5 is a view illustrating a triangular cross-sectional structure which is defined by the vehicle body cross members, the support members 140, and the center side member 310, according to an embodiment of the present invention. The center side member 310 may connect at least two vehicle body cross members to each other at the central portion of the support member 400 in the longitudinal direction of the vehicle. In an embodiment, for example, the center side member 310 may be configured to connect the second vehicle body cross member 220 and the fourth vehicle body cross member 240 to each other below the vehicle body floor 20, as illustrated in FIG. 5. The center side member 310 may also be connected at one side thereof to the support member 400, thereby contributing to an increase in the torsional rigidity of the vehicle.

Referring to FIG. 5, furthermore, it is possible to note the triangular cross-sectional structure D, which is defined in an inward direction of the vehicle by the support member 400, the center side member 310, and the second vehicle body cross member 220 to the fourth vehicle body cross member 240. This three-point support structure enables a load applied to the lower frame of the vehicle to be distributed to the center side member 310 and the first vehicle body cross member 210 to the fifth vehicle body cross member 250, with the result that the load allocated by each of the vehicle body cross members becomes very low, thereby improving stability of a battery.

Here, each of the support members 400 may be positioned in the same side as the side at which the center side member 310 is positioned. Because the support members 400, which connect two adjacent vehicle body cross members to each other in order to deal with a lateral collision of the vehicle, include a plurality of support members 400, it is possible to further increase the torsional rigidity of the vehicle. Furthermore, the plurality of support members 400 may be arranged in the same direction in the state of being spaced apart from each other in the longitudinal direction of the vehicle and may be connected at first sides thereof to the center side member 310.

All of the plurality of vehicle body cross members, the vehicle body side sills 300, and the support members 400, which have heretofore been described, may be connected to the vehicle body floor 20 of the vehicle. With the popularization of PBVs in which the height of the vehicle body floor 20 is lowered, the vehicle body side sill 300 is disposed at a lower level compared to a conventional vehicle, thereby weakening the structure for preparing for a lateral collision of the vehicle and also decreasing the rigidity of the vehicle body floor 20. Here, by connecting the vehicle body floor 20 to the plurality of vehicle body cross members, the vehicle body side sills 300, and the support members 400, an excessive load applied to the lower frame of the vehicle is distributed to the various members, thereby increasing the rigidity of the lower end of the vehicle body floor 20.

Figure 6:
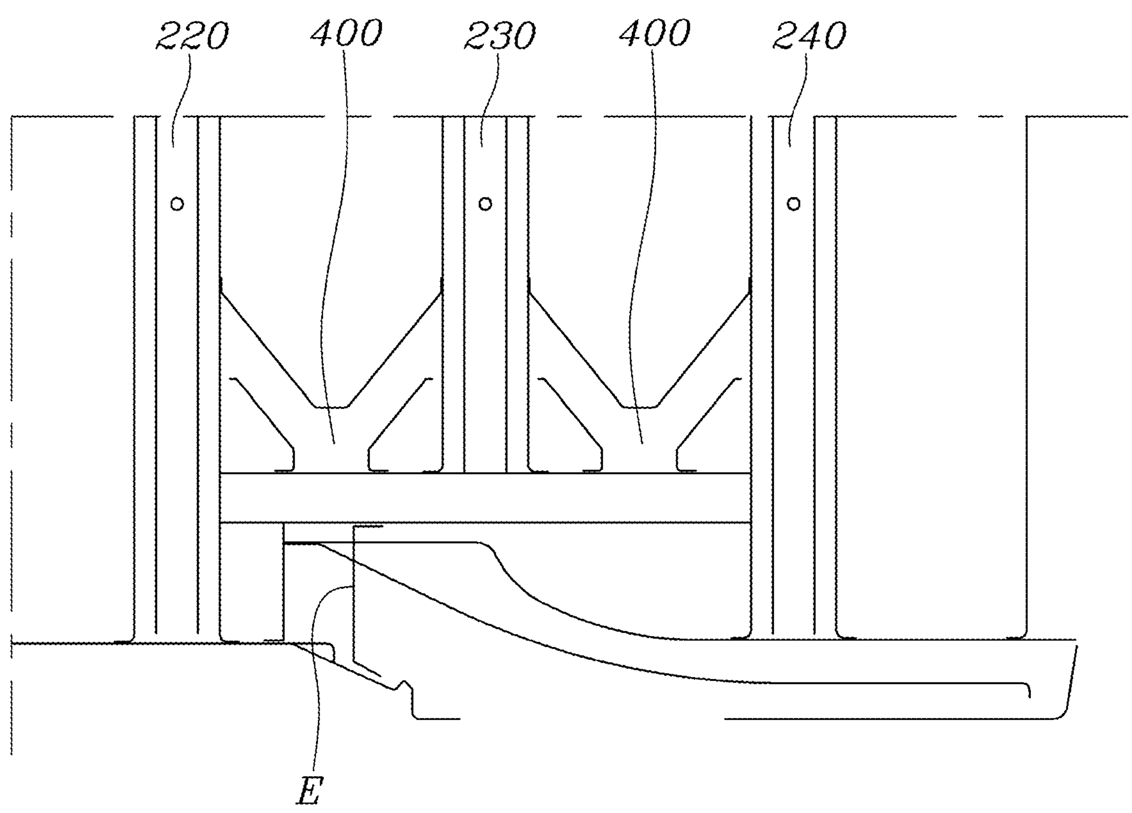
FIGS. 6 and 7 are views illustrating a partition wall which is formed by welding a B pillar to the door upper panel and the door lower panel, according to an embodiment of the present invention.
Figure 7:
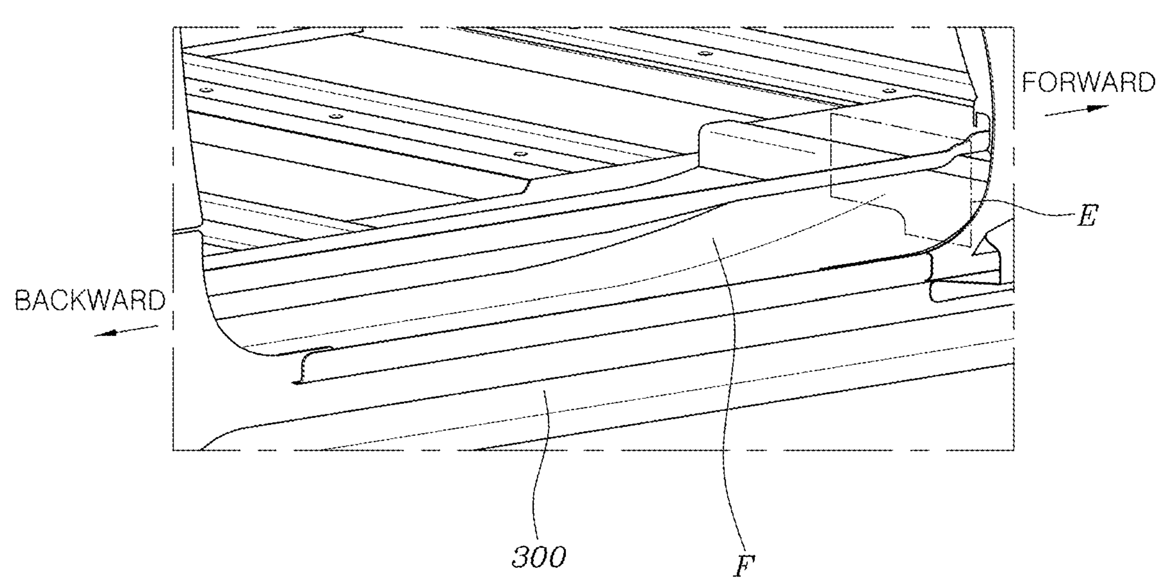

FIGS. 6 and 7 are views illustrating a partition wall which is formed by welding the B pillar 40 to the door upper panel 31 and the door lower panel 30, according to an embodiment of the present invention.

Referring to FIGS. 6 and 7, there is shown the partition wall E, which is formed by welding the B pillar 40 to the door upper panel 31 and the door lower panel 30 and which is closed in cross-section. By virtue of the structure of the partition wall E, it is possible to prevent an excessive load from concentrating on the door upper panel 31 and the door lower panel 30 and to distribute the load caused by a lateral collision to the B pillar 40.

Figure 8:
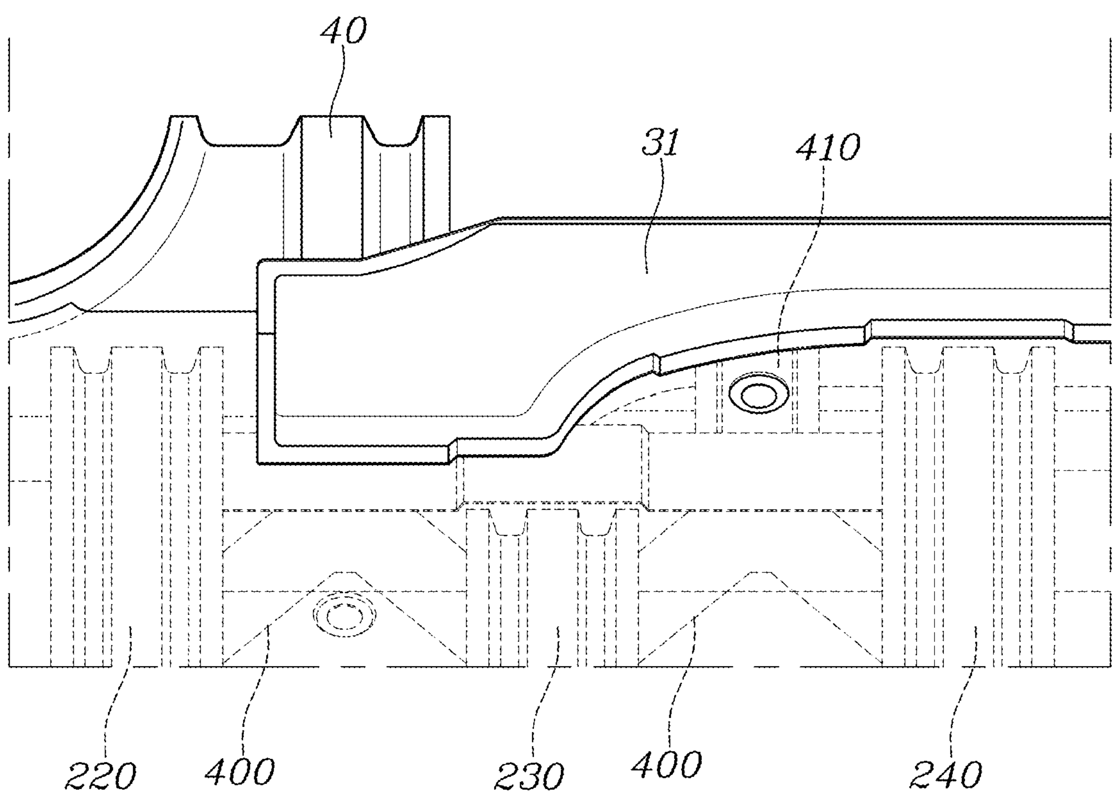
FIGS. 8 and 9 are views illustrating an extension member according to an embodiment of the present invention.
Figure 9:
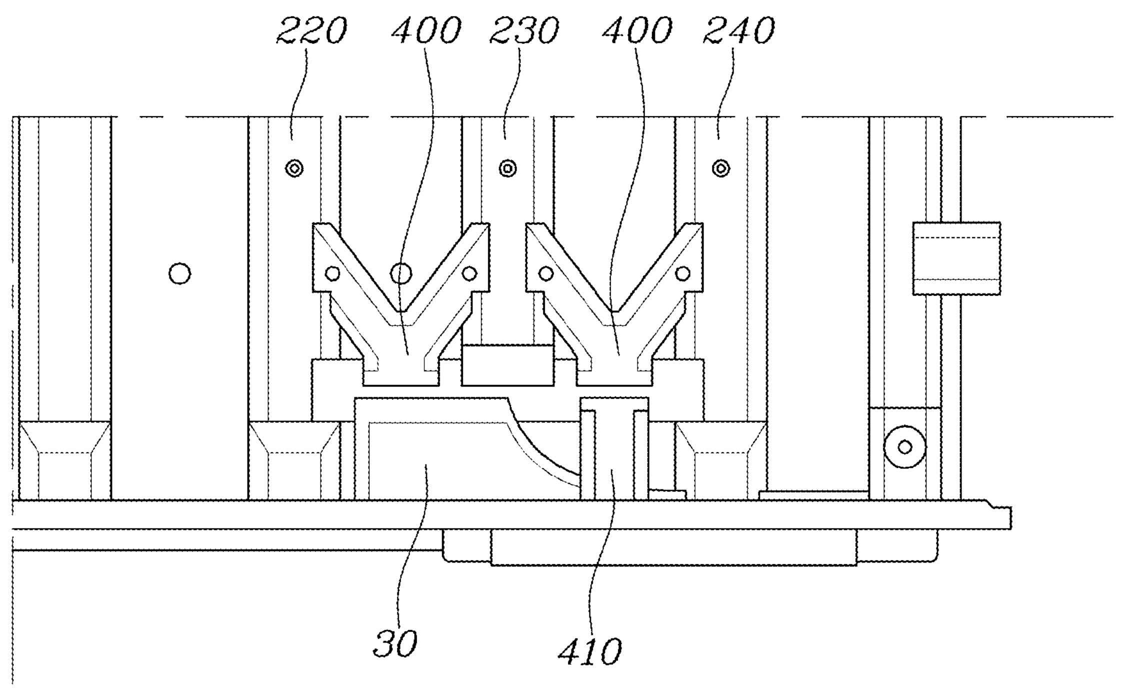

FIGS. 8 and 9 are views illustrating an extension member 410 according to an embodiment of the present invention.

Referring to FIGS. 8 and 9, the extension member 410 may extend in the direction of width of the vehicle to connect the center side member 310 to the vehicle body side sill 300. In a vehicle structure in which the end of the vehicle body side sill 300 is disposed at the lower end of the vehicle body cross member due to application of a sliding door, it is possible to form a load path for a lateral collision of the vehicle by disposing the additional extension member 410. In this case, the vehicle body cross members, the vehicle body side sills 300, the extension member 410, and the center side member 310 are connected to one another so as to form the load path for the lateral collision of the vehicle.

As is apparent from the above description, in a vehicle structure to which a sliding door is applied, since a load path for a lateral collision of the vehicle is formed by the effective connecting structure between the vehicle body cross members, the vehicle side sills, and the support members, torsional rigidity and connecting ability of the vehicle are maximized, and an excessive load applied to the lower frame of the vehicle is distributed to the various members, thereby improving stability of a battery upon the lateral collision of the vehicle.

Effects, which can be obtained by embodiments of the present invention, are not limited to the above-mentioned effects, and other effects of embodiments of the present invention, which are not mentioned above, will be clearly understood by those skilled in the art to which the present invention belongs, from the foregoing descriptions.

Although the preferred embodiments of the present invention have been described above with reference to the accompanying drawings, those skilled in the art will appreciate that embodiments of the present invention can be implemented in various other embodiments without changing the technical ideas or features thereof.

What is claimed is:

1. A vehicle frame assembly comprising:

a plurality of vehicle body cross members disposed at a vehicle body floor of a vehicle and extending in a width direction of the vehicle;

a vehicle body side sill disposed outside the vehicle in an outward direction of the vehicle body cross members, connected to the vehicle body cross members, and extending in a longitudinal direction of the vehicle;

a support member comprising extension ends extending in multiple directions from a center of the support member, each of the extension ends connecting at least one of the plurality of vehicle body cross members to the vehicle body side sill, wherein the plurality of vehicle body cross members, the vehicle body side sill, and the support member are connected to one another so as to define a load path for a lateral collision of the vehicle; and a chassis frame disposed at a lower portion of a vehicle body, the chassis frame being disposed in an inward direction of the vehicle and being configured to mount a battery pack, wherein the chassis frame comprises a plurality of mounting portions extending outwards, and wherein each of the vehicle body floor and the plurality of vehicle body cross members are fastened to a corresponding one of the plurality of mounting portions on an outer side of the chassis frame via a bolt.

2. The vehicle frame assembly according to claim 1, wherein each of the plurality of vehicle body cross members is connected to an inner surface of the vehicle body side sill in a state of being in surface contact therewith.

3. The vehicle frame assembly according to claim 1, wherein the chassis frame is detachably coupled to the plurality of vehicle body cross members and the vehicle body side sill.

4. The vehicle frame assembly according to claim 1, wherein all of the plurality of vehicle body cross members, the vehicle body side sill, and the support member are connected to the vehicle body floor of the vehicle.

5. The vehicle frame assembly according to claim 1, wherein, among the extension ends of the support member, two of the extension ends obliquely extend from the center thereof and are connected to two adjacent vehicle body cross members, and another of the extension ends extends outwards and is connected to the vehicle body side sill.

6. A vehicle frame assembly comprising:

a plurality of vehicle body cross members disposed at a vehicle body floor of a vehicle and extending in a width direction of the vehicle;

a vehicle body side sill disposed outside the vehicle in an outward direction of the vehicle body cross members, connected to the vehicle body cross members, and extending in a longitudinal direction of the vehicle;

a support member comprising extension ends extending in multiple directions from a center of the support member, each of the extension ends connecting at least one of the plurality of vehicle body cross members to the vehicle body side sill, wherein the plurality of vehicle body cross members, the vehicle body side sill, and the support member are connected to one another so as to define a load path for a lateral collision of the vehicle;

a center side member disposed at the center of the support member and connecting at least two of the plurality of vehicle body cross members to each other in the longitudinal direction of the vehicle, the center side member being parallel to the vehicle body side sill; and a chassis frame disposed at a lower portion of a vehicle body, the chassis frame being disposed in an inward direction of the vehicle and being configured to mount a battery pack, wherein the chassis frame comprises a plurality of mounting portions extending outwards, and wherein each of the vehicle body floor and the plurality of vehicle body cross members are fastened to a corresponding one of the plurality of mounting portions on an outer side of the chassis frame via a bolt.

7. The vehicle frame assembly according to claim 6, further comprising an extension member extending in the width direction of the vehicle and connecting the center side member to the vehicle body side sill, wherein the plurality of vehicle body cross members, the vehicle body side sill, the extension member, and the center side member are connected to one another to define the load path for the lateral collision of the vehicle.

8. The vehicle frame assembly according to claim 6, wherein the support member comprises a plurality of support members spaced apart from each other in the longitudinal direction of the vehicle and positioned in a same direction as the center side member.

9. The vehicle frame assembly according to claim 6, further comprising:

a door upper panel disposed above the vehicle body side sill and connected to the vehicle body floor; and a door lower panel disposed below the door upper panel and coupled to the door upper panel at a portion abutting the door upper panel.

10. The vehicle frame assembly according to claim 9, wherein the door upper panel and the door lower panel define therebetween an internal space configured to receive a door arm configured to allow a sliding door of the vehicle to be opened and closed.

11. The vehicle frame assembly according to claim 9, wherein each of the door upper panel and the door lower panel is connected to the vehicle body side sill at a first side thereof and has a shape which increases in width moving toward a center thereof from a rear portion thereof.

12. The vehicle frame assembly according to claim 9, wherein the center side member is coupled to the door lower panel so as to allow a load caused by the lateral collision of the vehicle to be transmitted to the door lower panel.

13. The vehicle frame assembly according to claim 6, wherein the chassis frame is detachably coupled to the plurality of vehicle body cross members and the vehicle body side sill.

14. The vehicle frame assembly according to claim 6, wherein all of the plurality of vehicle body cross members, the vehicle body side sill, and the support member are connected to the vehicle body floor of the vehicle.

15. The vehicle frame assembly according to claim 6, wherein, among the extension ends of the support member, two of the extension ends obliquely extend from the center thereof and are connected to two adjacent vehicle body cross members, and another of the extension ends extends outwards and is connected to the vehicle body side sill.

16. A vehicle comprising:

a vehicle body comprising a vehicle body floor;

a plurality of vehicle body cross members disposed at the vehicle body floor and extending in a width direction of the vehicle;

a pair of side sills disposed outside the vehicle on both sides of the vehicle, respectively, and extending in a longitudinal direction of the vehicle, wherein each of the pair of side sills is connected to respective ends of the vehicle body cross members;

a support member comprising extension ends extending in multiple directions from a center of the support member, each of the extension ends connecting at least one of the plurality of vehicle body cross members to one side sill of the pair of side sills, wherein the plurality of vehicle body cross members, the one side sill of the pair of side sills, and the support member are connected to one another so as to define a load path for a lateral collision of the vehicle; and a chassis frame disposed at a lower portion of the vehicle body in an inward direction of the vehicle, being configured to mount a battery pack, and detachably coupled to the plurality of vehicle body cross members and the pair of side sills, wherein the chassis frame comprises a plurality of mounting portions extending outwards, and wherein each of the vehicle body floor and the plurality of vehicle body cross members are fastened to a corresponding one of the plurality of mounting portions on an outer side of the chassis frame via a bolt.

17. The vehicle according to claim 16, wherein two extension ends of the support member obliquely extend from a center thereof and connect to two adjacent vehicle body cross members, and another extension end extends outwards to one side sill.

18. The vehicle according to claim 16, further comprising an extension member extending in a width direction of the vehicle and connecting a center side member to one side sill of the pair of side sills.

19. The vehicle according to claim 16, further comprising a battery pack mounted on the chassis frame, wherein the battery pack is positioned at a lowermost portion of the vehicle body and is supported at a lateral side thereof by the chassis frame.

20. The vehicle according to claim 16, wherein the support member comprises a plurality of support members spaced apart from each other in the longitudinal direction of the vehicle.

* * * * *